United States Patent [19]
Jordan

[11] Patent Number: 5,791,118
[45] Date of Patent: Aug. 11, 1998

[54] ENERGY ABSORBING FIBERGLASS SANDWICH PANEL WITH CORRUGATED CORE

[76] Inventor: Kurt M. Jordan, 242-B Evergreen Ave., Mill Valley, Calif. 94941

[21] Appl. No.: 729,919

[22] Filed: Oct. 15, 1996

Related U.S. Application Data

[63] Continuation-in-part of Ser. No. 508,622, Jul. 28, 1995, abandoned.

[51] Int. Cl.⁶ .................................................. A47B 13/08
[52] U.S. Cl. .................................. 52/783.11; 52/783.19; 52/783.15; 428/184
[58] Field of Search ........................ 52/783.11, 783.14, 52/783.15, 783.18, 783.19, 798.1; 428/183, 184

[56] References Cited

U.S. PATENT DOCUMENTS 4,748,067  5/1988  Cline.
5,612,117  3/1997  Belanger et al. ............... 52/794.1 X

*Primary Examiner*—Creighton Smith
*Attorney, Agent, or Firm*—Townsend & Townsend and Crew, LLP

[57] ABSTRACT

A damage resistant sandwich panel having a first outer face sheet for forming an outer face, a second inner face sheet for forming an inner face, and a core sandwiched between the first outer face sheet and the second inner face sheet. The core is a corrugated sheet having a plurality of elongated crests, a plurality of elongated valleys, and bridging core material between the elongated crests and the elongated valleys. This bridging core material is disposed at acute angles relative to each of the elongated crests and the elongated valleys. The first outer face sheet, the second inner face sheet and the core are constructed from a material having a tensile yield strength (elastic limit) in excess of 20,000 psi and a tensile strain to yield ratio exceeding 2.0%; a preferred material is fiber glass. The elongated crests of the core are fastened to the outer face sheet and the elongated valleys of the core are fastened to the inner face sheet to provide a first and largest spatial separation between the outer face sheet and the inner face sheet. When compressed by forces impacting the outer face sheet and/or the inner face sheet, the elongated crests and the elongated valleys of the core compress against the outer face sheet and inner face sheet to dispose the bridging core material between the elongated crests and the elongated valleys substantially normal to the outer face sheet and the inner face sheet.

8 Claims, 4 Drawing Sheets

ENERGY ABSORBING FIBERGLASS SANDWICH PANEL WITH CORRUGATED CORE

This application is a continuation-in-part of Ser. No. 08/508,622, filed Jul. 28, 1995 entitled Sandwich Panel with Corrugated Core Configured to Absorb and Rebound Energy from Impacts, now abandoned.

In this disclosure we limit the applicability of the disclosed core design to fiber reinforced composite materials like glass or carbon fibers embedded in a polyester, vinylester, or epoxy resin.

This invention relates to the design of sandwich panels constructed from fiberglass. Specifically a panel is disclosed consisting of two face sheets of fiberglass material separated by a core of sheet of fiberglass material with corrugations. Because of the combination of a tensile strain to yield strength ratio above 2% and an elastic limit above 20,000 pounds per square inch (psi), the panel has superior resistance to impact without permanent damage.

BACKGROUND OF THE INVENTION

Sandwich panel construction has been utilized for well over 25 years. Sandwich panel construction typically consists of the following primary elements. Two sheets of material are used for the facings of the panel and a core of a material separates the two facing sheets. The facing sheets are typically bonded to the core material.

The facing sheets typically have a thickness of much less than that of the overall panel. The facing sheets are typically made of, but not limited to, any of the following materials: aluminum, plastics, wood veneer, paper, or fiber reinforced composite materials like glass or carbon fibers embedded in a polyester, vinylester, or epoxy resin. The core typically has a thickness which forms the majority of the overall thickness of the panel. The core is typically made of, but not limited to, any of the following materials: foam materials such as urethane, woods such as balsa or plywood, or honeycomb material made of aluminum, plastic, or paper. Also the core can be made of sheet material such as that used in the facings, but formed in a corrugated or fluted pattern to increase its effective thickness through geometry. The facing sheets are typically bonded to each side of the core to create an integral panel.

The primary function of the aforementioned sandwich construction is to separate the two skins of the facing material to enhance the panel's flexural strength and stiffness beyond that of a panel consisting of a solid skin of lesser thickness. The core material primarily holds the facing sheets a predetermined distance apart, transfers shear between the two facing sheets when bending of the panel occurs, and supports the facings from local deformation due to buckling, crimping, or impacts. The primary positive effect of this type of construction is to utilize high strength facing skins where they are most efficient structurally for bending which is far away from the neutral axis of the panel, while supporting them by a lighter weight or less expensive core material. Thus sandwich panels increase the thickness and therefore the flexural structural capabilities with a core which is either lighter weight or less costly than that of a solid panel made entirely of the facing material.

The design and evolution of sandwich panels generally has followed two paths. The first path was that of military and aerospace design. This arena primarily consists of panels constructed with honeycomb type core material due to its high strength-to-weight ratio.

The second primary use of the sandwich construction has been in the marine industry. In this area cores of foam and balsa wood have dominated, even though their strength-to-weight ratio is not as high as honeycomb cores. Some primary reasons for this is that honeycomb or corrugated core material has cavities in the sandwich panel which could collect water which is undesirable in a marine environment. Another primary reason is that the cost is less than that of most honeycomb cores.

The sandwich construction with a corrugated core began to be utilized decades ago, as can be seen from documents such as Military Handbook 23, first published by the Department of Defense in 1968. In the last several decades design and technology has focused on the two major areas of sandwich panel uses as mentioned above, and thus has progressed with core materials other than corrugated core. Thus the state of the art for corrugated core sandwich construction has been stagnant for decades. This can be seen by the similarity of published design information available in contemporary books such as Composite Design by Stephen Tsai, published by Think Composites, Dayton Ohio, in 1988, to that of the cited above 1968 publication.

The state of the art as shown by the above mentioned design books has one primary consistent theme: Sandwich panels with corrugated cores are designed so that the core is rigid, and design equations base failure on the first mode of buckling of any of the components of the core or face sheets. Stated another way, when any component of the core or face sheet becomes unstable the panel will catastrophically fail. This leads to design configurations of corrugated core sandwich panels which have no built-in mechanism for resistance to distortion and impacts beyond the range of the rigid design philosophy.

Other core materials for sandwich construction have a similar design characteristic to that of the corrugated core. Their designs are towards rigidity. Large distortions from impacts are resisted without any large flex or strain of the core, or are resisted by failure of the core. Design variations to increase this resistance to damage from impacts always involve either an increase of weight or an increase of cost of the core material. Some examples of this follow:

(a) Typically honeycomb sandwich panels either rebound impacts to their surface without local distortion to the core or absorb them by the mechanism of the walls of the honeycomb core buckling progressively. This later mechanism is used often for energy absorbing structures such as car bumpers, but it causes permanent failure in the core material. Typically to increase the resistance to impact damage the material used in the honeycomb either must be replaced with a stronger material or the density of the core must be increased. Following either of these avenues typically raises the cost and the weight of the core material which goes against the two primary reasons for the use of sandwich panel construction. Historically honeycomb cores have proven to be to costly for many commercial applications.

(b) Typical foam or wood core materials either rebound impacts to their surface without significant local deformations to the core or they experience permanent fractures to the core which jeopardizes the structural capabilities of the panel. The typical method for increasing the core's resistance to damage from impact distortion is to increase the density of the material. As with the honeycomb this usually increases both the cost of the core material and the weight of the core material, both of which also go against the primary purpose of sandwich panel construction.

(c) An example of a commercially used sandwich panel is the FRP (fiberglass reinforced plywood) panels used in many truck and trailer wall panels. This is a case where durability and cost of core material drove the industry to the use of plywood core because the density of the material was needed for the desired impact durability. In this case the need for impact resistance resulted in a sandwich panel that has a core which satisfies one of the primary goals of a sandwich panel,—cost—while violating the other primary goal of sandwich construction, i.e., light weight panels.

The examples and text above point to the nature of several of the trade offs encountered while selecting core material for sandwich panel construction. These trade-offs are of structural capabilities for impact-damage tolerance, cost of the core, and weight of the core. While there are numerous successful products constructed with sandwich panels, there is a need for a sandwich panel core material which is both cost effective, light in weight, and has greater resistance to impact damage than the current state of the art.

SUMMARY OF THE INVENTION

A damage resistant sandwich panel having a first outer face sheet for forming an outer face, a second inner face sheet for forming an inner face, and a core sandwiched between the first outer face sheet and the second inner face sheet. The core is a corrugated sheet having a plurality of elongated crests, a plurality of elongated valleys, and bridging core material between the elongated crests and the elongated valleys. This bridging core material is disposed at acute angles relative to each of the elongated crests and the elongated valleys. The first outer face sheet, the second inner face sheet and the core are constructed from a material having a tensile yield strength (elastic limit) in excess of 20,000 psi and a tensile strain to yield ratio exceeding 2.0%; a preferred material is fiber glass. The elongated crests of the core are fastened to the outer face sheet and the elongated valleys of the core are fastened to the inner face sheet to provide a first and largest spatial separation between the outer face sheet and the inner face sheet. When compressed by forces impacting the outer face sheet and/or the inner face sheet, the elongated crests and the elongated valleys of the core compress against the outer face sheet and inner face sheet to dispose the bridging core material between the elongated crests and the elongated valleys substantially normal to the outer face sheet and the inner face sheet.

OBJECTS AND ADVANTAGES

Accordingly, besides the objects and advantages of the impact resistant corrugated sandwich panel described above, several objects and advantages of the present invention are:

(a) to provide a sandwich panel which has an increased resilience to impact damage over that of other similar existing corrugated core sandwich panels, (b) to provide a sandwich panel which has an advantage over existing honeycomb sandwich panels in one or more of the following areas: impact resistance, cost, weight, and ease of manufacture, (c) to provide a sandwich panel which has an advantage over existing foam or wood sandwich panels in one or more of the following areas: impact resistance, cost, weight, and ease of manufacture, (d) to provide a sandwich panel which is globally rigid for carrying structural loads but which is locally flexible or resilient to help facilitate the panel's endurance from permanent damage caused by impacts to its surface, (e) to provide a means for configuring a sandwich panel with a core material and core configuration to allow flexural distortion of the core and facings which increases the panel's resistance to damage due to surface impacts over that of a panel designed with rigid core, and (f) to provide a means for configuring the geometry and materials of the corrugated core to allow a sandwich panel to have a bi-linear or multi-linear response to impacts, thus increasing the panel's initial tolerance to damage from impacts, while having a second threshold of stability or rigidity while the core is in a predetermined distorted configuration.

Further objects and advantages are to provide a means of configuring and manufacturing sandwich panels which are easy to manufacture, which are light in weight, which are resistant to damage from impacts, and which are inexpensive when compared to other sandwich panels with similar structural properties. Still further objects and advantages will become apparent from consideration of the ensuing description and drawings.

DESCRIPTION OF THE PREFERRED EMBODIMENT

Figure 1:
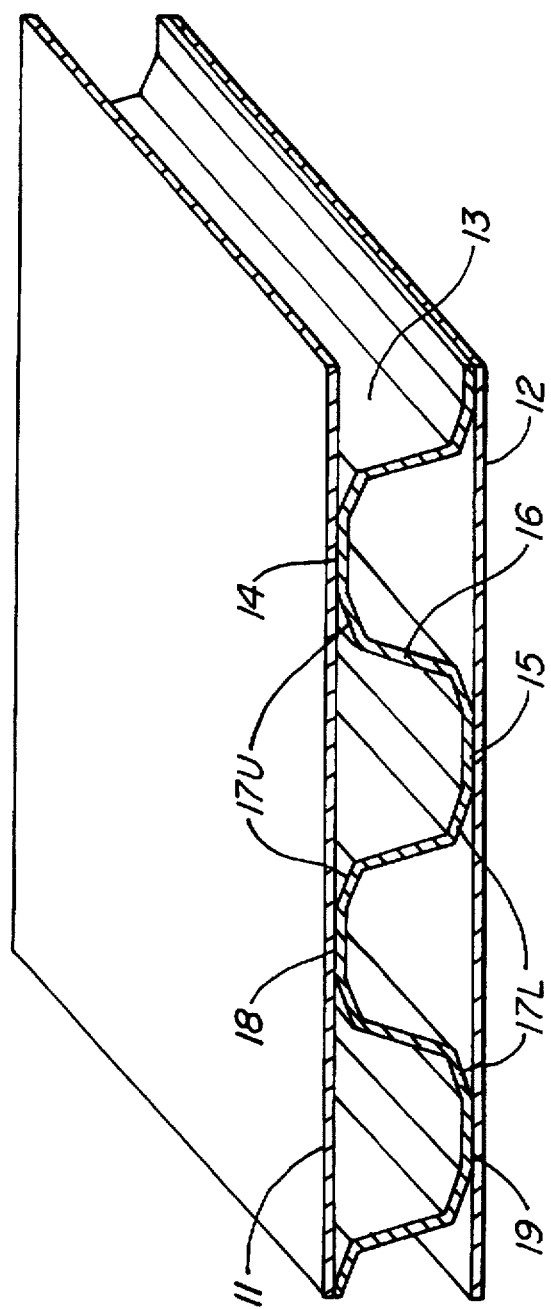
FIG. 1 shows a perspective of a sandwich panel with a symmetric single faceted corrugated core in accordance with the invention.

A typical embodiment in accordance with the invention is shown in FIG. 1. The sandwich panel consists of a composite structure of a generally planar or curved form consisting of thin outer face sheet 11, thin inner face sheet 12, and thin corrugated core sheet 13. The sheeting material of thin outer face sheet 11, thin inner face sheet 12 and thin corrugated core sheet 13 must be constructed of a thin structural material such as fiber reinforced composite materials like glass or carbon fibers embedded in a polyester, vinylester or epoxy resin.

Regarding such use of such fiber reinforced composite materials like glass or carbon fibers embedded in a polyester, vinylester, or epoxy resin, attention is directed to the following comparative Table I. Specifically, it will be seen in Table I, fiber reinforced composite materials like glass or carbon fibers embedded in a polyester, vinylester, or epoxy resin are compared to both papers and metals. As will hereinafter become apparent, I require the use of fiber reinforced composite materials like glass or carbon fibers embedded in a polyester, vinylester, or epoxy resin for the practice of this invention.

From the materials, it will be seen that fiber reinforced composite materials like glass or carbon fibers embedded in a polyester, vinylester, or epoxy resin have important properties. Specifically, and from Table I, I require that the material from which the panel is constructed have a tensile yield strength (elastic limit) in excess of 20,000 psi. At the same time, the same material must have a tensile strain to yield ratio exceeding 2.0%. Looking at Table I, it will be seen that these requirements specifically exclude paper and metal.

Figure 2:
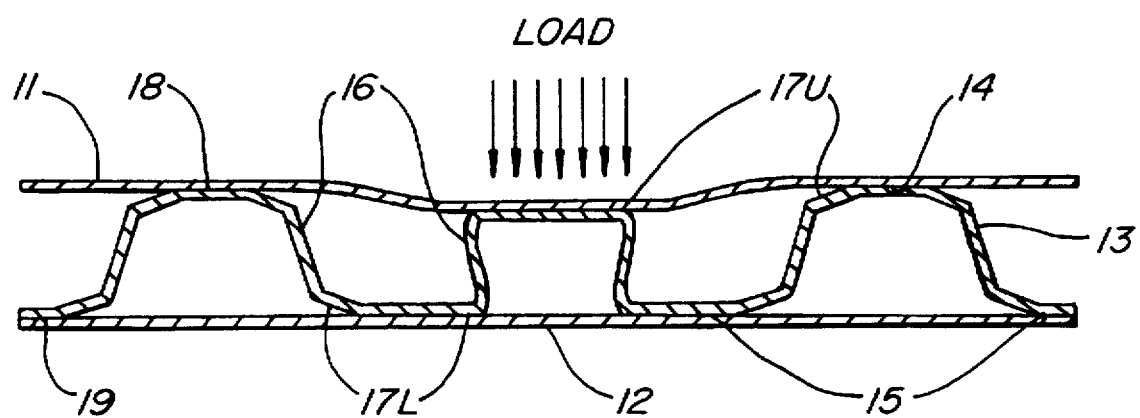
FIG. 2 shows a cross-section of the panel configuration shown in FIG. 1 in a typical distorted shape during an impact or concentrated load.
Figure 3:
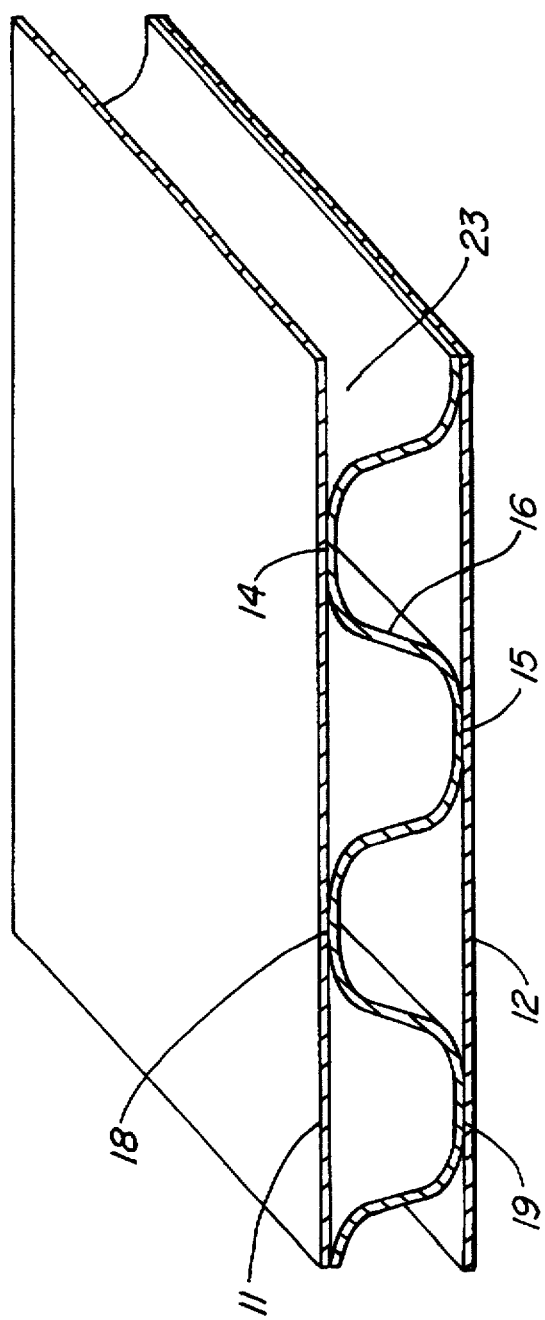
FIG. 3 shows a perspective of the sandwich panel with a symmetric complex curvature configuration of the corrugated core; and, FIG. 4 shows a perspective of the sandwich panel with asymmetrical faceted core legs.
Figure 4:
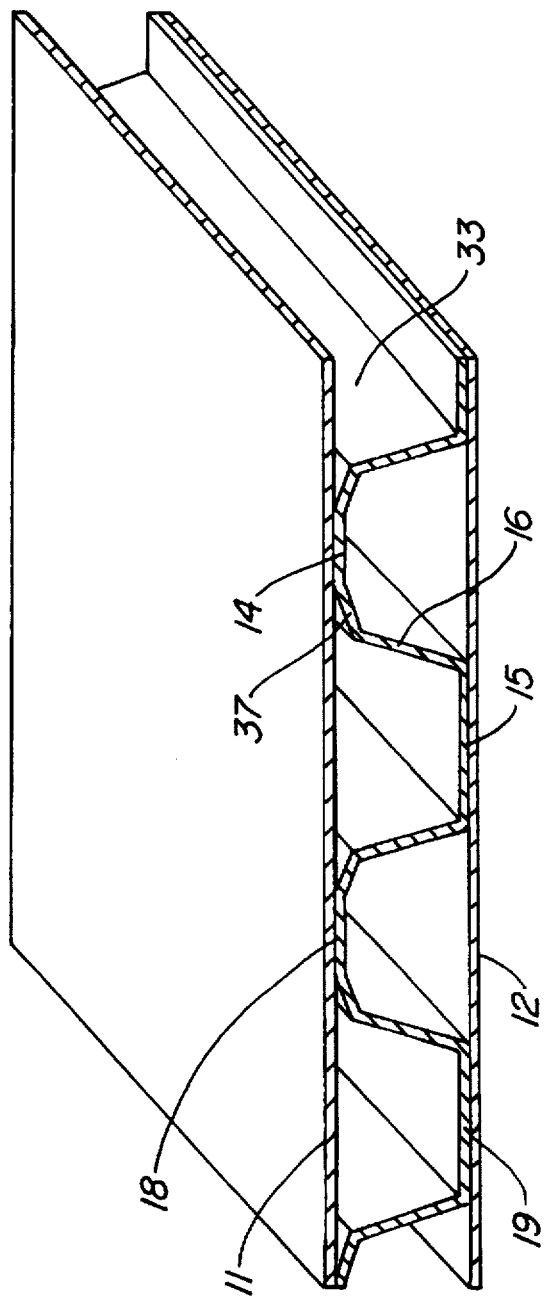

The reader will note that with respect to FIGS. 1, 3, and 4, I show thin outer face sheet 11, thin inner face sheet 12 and corrugated core legs 16 which look similar to corrugated cardboard commercially produced. However, the similarity ends there. It is to be understood that no known cardboard or metal core product assumes or can assume the energy absorbing configuration shown in FIG. 2. Attempts to have cardboard reach the illustrated construction shown in FIG. 2 result in destruction of the cardboard core and permanent damage to the cardboard core. During the tests using the cardboard core, no configuration similar to the configuration shown in FIG. 2 was ever attained.

Regarding Table I, it is important to note that the fiberglass laminates have a yield strength equal to their ultimate strength. These materials behave very linear throughout their range and do not have a separate yield point.

Thin corrugated core sheet 13 is formed in longitudinal corrugations or flutes consisting of repeating core peaks 14, and core valleys 15. Corrugated core peaks 14 are those portions of the corrugated core 13 which are generally parallel and adjacent to outer face sheet 11. Corrugated core valleys 15 are those portions of corrugated core 13 which are generally parallel and adjacent to inner face sheet 12.

Attention may now be directed to corrugated core legs 16. These corrugated core legs 16 have two functions. First, and when the panel is generally unstressed, they form a part of the corrugated central core. Secondly, and when the panel comes under compression at either thin outer face sheet 11 or thin inner face sheet 12, corrugated core legs 16 move to the essential normal disposition with respect to the face sheets 11, 12. With brief reference to FIG. 2, it can be seen that corrugated core legs 16 are essentially normal to face sheets 11, 12.

It will be seen that when the panel is unstressed, corrugated core legs 16 are generally not parallel to outer face sheet 11 or inner face sheet 12. Corrugated core legs 16 connect corrugated core peaks 14 to corrugated core valleys 15.

Upper corrugated core leg facets $17_U$ and lower corrugated core leg facets $17_L$ are those portions of corrugated core leg 16 which have discrete geometry differences to that of the general plane of corrugated core legs 16. Corrugated core legs 16 and corrugated core facets 17U and 17L can be either straight as shown or can contain some curvature. As I prefer these members to be straight, they are here shown in the straight disposition.

Corrugated core 13 is sandwiched between outer face sheet 11, and inner face sheet 12. Outer sheet 11 is fixed to corrugated core peaks 14 at outer face-to-core interfaces 18 by a means of bonding, or otherwise continually affixing to surfaces. Thin inner face sheet 12 is similarly fixed to corrugated core valley 15 at inner face-to-core interfaces 19.

Thin outer face sheet 11 and thin inner face sheet 12 provide the primary means for enabling the panel to carry structural loads such as tension, compression, in-plane shear and bending. Corrugated core 13 serves several basic purposes as described below:

First, corrugated core 13 supports outer sheet 11 and inner sheet 12 at some distance apart.

Second, corrugated core 13 transmits shear forces between outer sheet 11 and inner sheet 12 when the panel is subjected to bending, much as the shear web of a typical I-beam transmits shear between the two flanges of the I-beam in response to bending.

Third, corrugated core 13 stabilizes outer sheet 11 and inner sheet 12 from local deformation and buckling when they are subjected to loads.

Fourth, corrugated core 13 supports outer sheet 11 and/or inner sheet 12 when the panel experiences impacts or other loads to its surface.

The means by which corrugated core 13 supports outer face sheet 11 and/or inner face sheet 12 when the panel experiences loads or impacts to its surface is a primary characteristic of this sandwich panel. Corrugated core 13 has geometry, thickness, and materials that are designed in balance with the thickness and materials of outer face sheet 11 and inner face sheet 12. An example of the construction of the sandwich panel shown in FIG. 1 would have outer face sheet 11, inner face sheet 12, and corrugated core 13 constructed of fiberglass reinforced epoxy resin sheet material of thicknesses from, but not limited to, 0.060" to 0.100" thick, and the overall panel could have a thickness of, but not limited to 1" to 6".

Thicknesses in this respective ranges produce a corrugated sandwich panel which contains similar structural capabilities to that of an equivalent conventional sandwich panel. This panel has the added benefit of having an increased resistance to damage caused by loads or impacts to its surface.

Referring to FIG. 2, the operation of this sandwich panel allows corrugated core 13 to distort along with outer face sheet 11 and/or inner face sheet 12 when they are subjected to loads or impacts to the panels surface. The panel distorts to some predetermined level without any permanent damage occurring in any of the sandwich panels members. This allows the sandwich panel to absorb and rebound energy from loads or impacts to its surface without permanent damage.

In the preferred configuration I show in FIG. 1, when the surface of the panel is impacted face sheet 11 or 12 and corrugated core 13 flex inward. Corrugated core legs 16 begin to flex into a curved shape while corrugated core leg facets $17_U$ and $17_L$ flex towards face sheet 11 and/or 12 in a spring like fashion. When the distortion of the impact is large enough, the flexing of the corrugated core leg facets $17_U$ and $17_L$ may come in contact with facing sheet 11 or 12, further resisting the distortion.

If the distortion of the impact continues corrugated core leg facets $17_U$ and $17_L$ may come in full contact with face sheets 11 and/or 12 as shown in FIG. 2. At this distorted shape, the leverage the distortion had on core facets $17_U$, and $17_L$ has diminished and the remaining distortion in the core is resisted by the other, more vertical portion of core leg 13. This remaining portion of core leg 13 is aligned more perpendicularly to face sheets 11 and 12 than core leg facets $17_U$ and $17_L$ giving it an increased resistance to the distortion. Preferably the configuration and materials are designed to allow repeated distortion to the surface of the panel to the point where core leg facets $17_U$ and $17_L$ are in full contact with facing sheets 11 and/or 12 without any permanent damage or fracture of any of the materials. At this point the panel has a second point of stability and has an increased resistance to continued distortion from the load to its surface.

The action of the panel illustrated in FIG. 2 can be considered from an energy absorbing point of view. Upon impact the core thin outer face sheet 11 or thin inner face sheet 12 undergoes flexure. This contacts upper corrugated core leg facets $17_U$ and/or lower corrugated core leg facets $17_L$ to absorb the peak energy. Then as the facets $17_U$ and $17_L$ come in complete contact with the face sheet 11 and 12, corrugated core legs 16 align themselves in a perpendicular fashion to the facings 11, 12 without damaging the highest stresses in part of the core which is the facet corner. This perpendicular alignment of corrugated core legs 16 increases the resistance to the impact while still maintaining the skins at some predetermined distance apart so that the panel maintains overall rigidity. This is a second line of defense to the panel against impact. Presuming that no further force is applied to the panel, the panel rebounds to its previous shape without permanent damage.

The perspective view in FIG. 3 shows an alternative configuration of corrugated core 13 of FIG. 1. In this configuration corrugated core legs 13 and corrugated core leg facets $17_U$ and $17_L$ have varying curvature with no distinct facet transition. In this configuration the varying curved nature of corrugated core 23 allows core distortion to occur to predetermined levels without permanent damage occurring in any of the panel's components.

The perspective view in FIG. 4 shows an alternative configuration of corrugated core 13 and core facets $17_U$ and $17_L$ as shown in FIG. 1. The geometry of corrugated core 33 is not symmetrical about the mid-plane of the panel. Corrugated core facets 37 exist only adjacent to the outer face sheet 11. It will be understood that corrugated core 33 can be configured to provide different levels of resistance to permanent damage from impacts to either outer facing sheet 11, or inner facing sheet 12.

An alternative configuration of corrugated core 13, is to stack multiple layers of corrugated core on top of one another. This configuration provides a sandwich panel which consists of two or more corrugated cores 13, sandwiched between outer face sheet 11, and inner face sheet 12. In this configuration corrugated cores 13 are affixed by some means such as bonding at their coincident corrugated core peaks 14, and corrugated core valleys 15. This alternative use could be utilized with any of the configurations shown in FIGS. 1, 3, and 4.

In another alternative configuration of the corrugated sandwich panel corrugated core peaks 14 are an integral part of the material of outer face sheet 11, and corrugated core valleys 15 are an integral part of inner face sheet 12. This configuration lends itself to reduced cost and weight by eliminating the doubling up of material along interfaces 18 and 19 between corrugated core 13 and outer and inner facing sheets 11 and 12. This configuration requires a different means of manufacture since the different components are integrally formed together, such as but not limited to extrusion or pultrusion of a fiber reinforced plastic material. This alternative use could be utilized with any of the configurations shown in FIGS. 1, 3, and 4.

Thus the reader can see that the corrugated sandwich panel is light in weight, and uses an inexpensive core material which enables the sandwich panel to resist damage from loads or impacts to the surface of the panel.

Many other variations are possible. For example the geometry of corrugated core can have many combinations of facets and curvature, and many combinations of material properties to balance the panels resistance to various impact requirements for different usages. Examples of this are seen in alternate configurations provided. One such example is that of the stacking of multiple sheets of corrugated core. This configuration allows the sandwich panel to have a larger range of distortion before all of the corrugated facets come into full contact. Another illustration is the savings of material realized when the sandwich panel is configured with the corrugated core peaks and valleys an integral part of the outer and inner facing sheets. Accordingly, the scope of the invention should be determined not by the embodiments illustrated, but by the appended claims and their legal equivalents.

TABLE I

Comparison of typical material properties

| Property: | Young's Modulus (MSI) | (Elastic Limit) Tensile Yield (PSI) | Tensile Strain to Yield (in/in) | Ultimate Tensile Strength (PSI) |
|---|---|---|---|---|
| Material: | | | | |
| 1 Typical Paper (Cross Direction)* | 0.4 | 2000 | 0.50% | 5023 |
| 2 Typical Paper (Machine Direction)* | 0.85 | 4246 | 0.50% | 6922 |
| 3 Common fiberglass WR/CSM | 1.2 | 28000 | 2.33% | 28000 |
| 4 Common Performance Fiberglass laminate | 1.6 | 42000 | 2.63% | 42000 |
| 5 High Quality Fiberglass Laminate | 2.4 | 62000 | 2.58% | 62000 |
| 6 E-glass fibers | 10.5 | 500000 | 4.76% | 500000 |
| 7 Aluminum (6061-T6) | 10.3 | 40000 | 0.39% | 45000 |
| 8 Steel A36 (common) | 29.7 | 36000 | 0.12% | 56000 |
| 9 Steel (high strength) | 29.7 | 70000 | 0.24% | 85000 |
| 10 Douglas Fir | 1.6 | 12400 | 0.78% | 12400 |

Notes:
Materials 1 and 2. Properties from TAPPI press 'The Properties of Paper, An Intro.'
*Paper products have higher properties in the direction of the machine during manufacturing due to the alignment of fibers.
Material 3, This represents a typical Woven Roving/Chopped strand mat fiberglass laminate. The most typical laminate in most boat construction.
Material 4, This represents typical high end production laminates utilized on many contemporary boats.
Material 5, This represents Typical Aerospace fiberglass/epoxy laminate.
Material 6, This is common raw fiberglass prior to laminating.
Materials 7 through 10, Source, Mark's Mechanical Engineering Handbook, 9th ed.

What is claimed is:
1. A damage resistant sandwich panel comprising:
a first outer face sheet for forming an outer face;
a second inner face sheet for forming an inner face;
a core sandwiched between the first outer face sheet and the second inner face sheet comprising a corrugated sheet having a plurality of elongated crests, a plurality of elongated valleys, and bridging core material between the elongated crests and the elongated valleys, this bridging core material disposed at acute angles relative to each of the elongated crests and the elongated valleys;

the first outer face sheet, the second inner face sheet and the core constructed from a material having a tensile yield strength (elastic limit) in excess of 20,000 psi and a tensile strain to yield ratio exceeding 2.0%;

the elongated crests of the core being fastened to the outer face sheet and the elongated valleys of the core being fastened to the inner face sheet to provide a first and largest spatial separation between the outer face sheet and the inner face sheet with the bridging core material between the elongated crests and the elongated valleys being disposed at an angle with respect to the outer face sheet and the inner face sheet;

the elongated crests and the elongated valleys of the core when compressed by forces impacting the outer face sheet and/or the inner face sheet compressing against said respective outer face sheet and inner face sheet to dispose the bridging core material between the elongated crests and the elongated valleys substantially normal to the outer face sheet and the inner face sheet to impart increased resistance to the panel and the panel can elastically return to the first and largest spatial separation.

2. A damage resistant sandwich panel according to claim 1 comprising:

the material of said panel is fiber reinforced composite materials.

3. A damage resistant sandwich panel according to claim 2 comprising:

the fibers are chosen from the group comprising glass and carbon fibers.

4. A damage resistant sandwich panel according to claim 3 comprising:

the fibers are embedded in a resin chosen from the group comprising vinylester resin, polyester resin and epoxy resin.

5. A damage resistant sandwich panel comprising:

a first outer face sheet for forming an outer face;

a second inner face sheet for forming an inner face;

a core sandwiched between the first outer face sheet and the second inner face sheet comprising a corrugated sheet having a plurality of elongated crests, and bridging core material between the elongate crests, this bridging core material disposed at acute angles relative to each of the crests;

the first inner face sheet, the second outer face sheet and the core constructed from a material having a tensile yield strength (elastic limit) in excess of 20,000 psi and a tensile strain to yield ratio exceeding 2.0%;

the crests of the core being fastened to the outer face sheet and the bridging core material being fastened to the second outer sheet to provide a first and largest spatial separation between the outer face sheet and the inner face sheet with the bridging material between the crests being disposed at an angle with respect to the outer face sheet and the inner face sheet;

the crests of the core when compressed by forces impacting the outer face sheet compressing against the respective outer face sheet to dispose the core bridging material substantially normal to the outer face sheet and the inner face sheet in a second and smaller separation between the outer face sheet and the inner face sheet to impart increased resistance to the panel and the panel can elastically return to the first and largest spatial separation.

6. A damage resistant sandwich panel according to claim 5 comprising:

the material of said panel is fiber reinforced composite materials.

7. A damage resistant sandwich panel according to claim 6 comprising:

the fibers are chosen from the group comprising glass and carbon fibers.

8. A damage resistant sandwich panel according to claim 6 comprising:

the fibers are embedded in a resin chosen from the group comprising polyester resin, vinylester resin, and epoxy resin.

\* \* \* \* \*